UNITED STATES PATENT OFFICE.

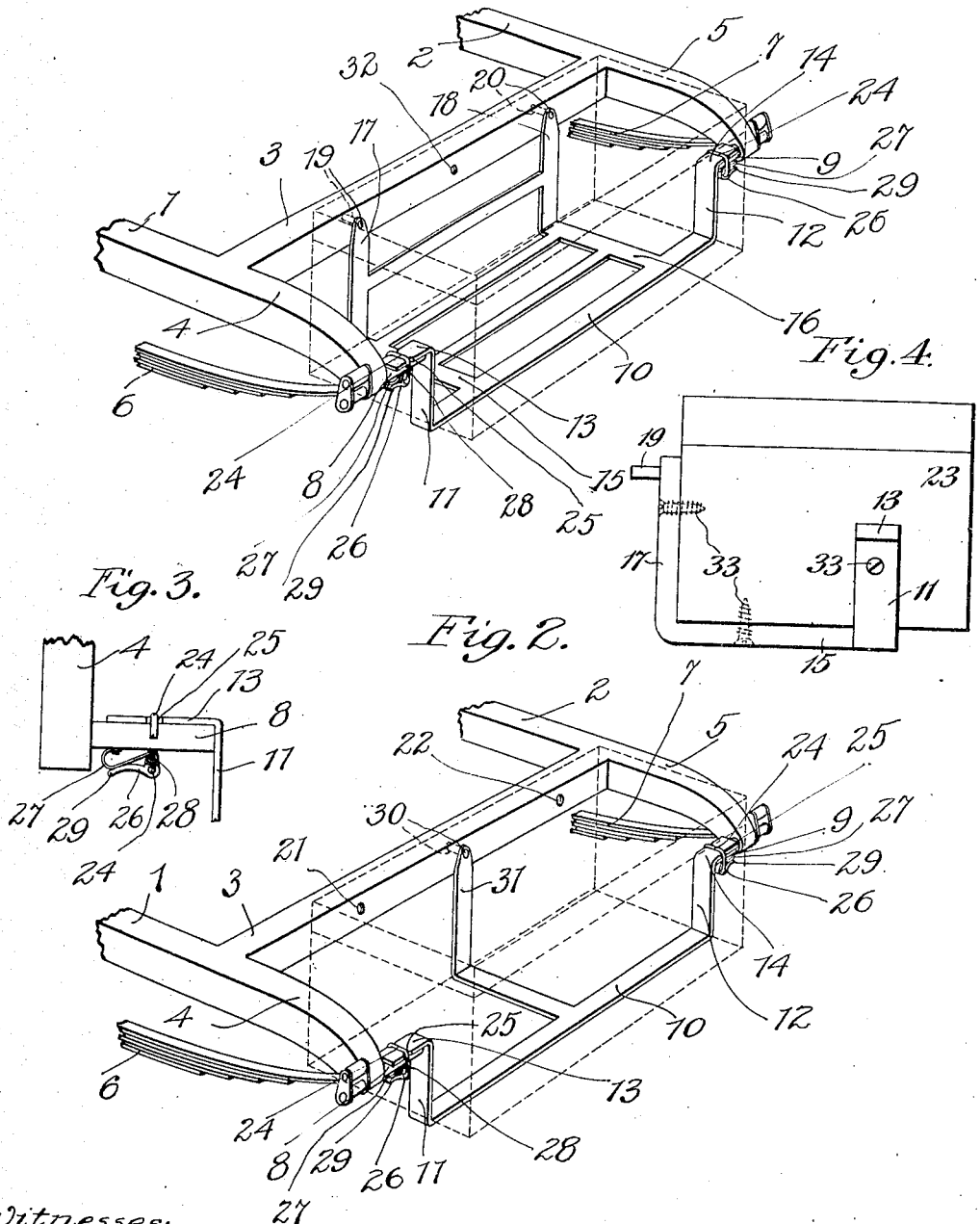

EDWIN F. BROWN, OF CHICAGO, ILLINOIS.

ATTACHMENT FOR VEHICLES.

No. 916,529.  Specification of Letters Patent.  Patented March 30, 1909.

Application filed May 6, 1907.  Serial No. 372,184.

*To all whom it may concern:*

Be it known that I, EDWIN F. BROWN, citizen of the United States, residing at Chicago, in the county of Cook and State of Illinois, have invented a certain new and useful Improvement in Attachments for Vehicles, of which the following is a full, clear, concise, and exact description, reference being had to the accompanying drawings, forming a part of this specification.

My invention relates to attachments for vehicles, particularly automobiles.

Baggage supporting frames are usually supplied for automobiles to which frames trunks or other baggage are strapped, the frame being in some manner rigidly secured to the automobile frame. The securing of trunks or baggage to the carrier frame by means of straps is very unsatisfactory, as the trunk or baggage will jar loose, and the straps become soiled and ruined and hard to manipulate after a run through wet or muddy weather. The chief objection, however, is the fact that no matter how tightly the trunk or baggage are at first strapped to the frame, they will rattle and shake loose owing to the jarring and bumping of the vehicle.

The object of my invention, therefore, is to provide means for securing a trunk or baggage to a vehicle which will at all times hold the trunk or baggage securely in place and will not allow it to rattle or jolt. I, therefore, provide a carrier frame which may be rigidly and permanently secured to a trunk or baggage box, for instance, the frame being provided with suitable projections and arms for engaging with parts of the vehicle to be rigidly clamped or secured thereto in such manner that the frame may be readily released and removed with the trunk or box.

My invention will be better understood when described by reference to the accompanying drawing in which—

Figure 1 is a perspective view showing a trunk with a carrier frame secured thereto and attached to the vehicle, and Fig. 2 shows a modified arrangement. Fig. 3 shows in detail the clamping arrangement. Fig. 4 is an end view of the carrier frame and box shown in Fig. 1.

In Fig. 1 I have shown the rear end of an automobile frame which comprises the side-members 1 and 2 and the rear cross member 3, this frame being usually of steel. The side members 1 and 2 extend rearwardly beyond the cross member 3 a distance to form the spring supporting extensions 4 and 5 to which one end of springs 6 and 7 are shown connected. Extending inwardly from the ends of the extensions 4 and 5, parallel with the cross piece 3 are the lugs or shelves 8 and 9, and on some vehicles these are already in place in the form of steps for mounting the vehicle. These steps 8 and 9 are utilized as supporting means for my carrier frame. This carrier frame may be in skeleton form, as shown, comprising the front horizontal strap 10 from whose ends extend upwardly the parts 11 and 12 and from the upper ends of these parts 11 and 12 extend outwardly the short projections 13 and 14 for engaging over the ends of the lugs or steps 8 and 9. The transverse members 15 and 16 terminate at their rear ends in the vertical members 17 and 18 which are shown terminating in horizontal pins or projections 19 and 20 respectively for engaging in openings 21 and 22 respectively formed in the cross piece 3 of the frame. The carrier frame may be permanently secured to the trunk or baggage box 23 by screws 33 as shown in Fig. 4, and when it is to be carried with the vehicle, the pins 19 and 20 are inserted in the openings 21 and 22 and the parts 13 and 14 engage or hook over the steps or lugs 8 and 9. To secure the frame in this position various means may be employed, such, for instance, as by the use of common clamps to clamp the parts 13 and 14 to the steps 8 and 9 or by bolts passing through the parts 13 and 14 and the corresponding steps. I, however, have shown a spring clamp for securing the parts 13 and 14 to the steps. Each spring clamp comprises a link 24 which when applied to lock, rests in the groove 25 at the end of the corresponding projection 13, for instance. The lower end of this link engages through the elbow of the bell crank-shaped locking member 26. One end of a spring 27 pivots about the pin 28, passing through the end of one arm of the bell crank-frame, the other end of the spring being secured to the step 8. The other arm 29 of the bell crank member forms a handle for actuating the locking member. When the frame is applied, the links are hooked over the ends of the extensions 13 and 14, and the arms 29 which are normally horizontal are swung 180 degrees to engage underneath the spring and to lock themselves and the links whereby the ends 13 and 14 of the frame are securely clamped to the projections or steps 8 and 9. The use of the lugs 8 and 9 as steps is not interfered with in this arrangement. When it is desired to remove the trunk, the locking members 26 are revolved to release the locking links which are removed from the extensions 13 and 14 whereupon the trunk with the frame can be easily withdrawn from the vehicle. This frame when clamped to the vehicle has no chance to work loose, and the trunk being securely and permanently fastened to the frame will also remain in a fixed position and no straps are necessary to hold it.

As shown in the modification in Fig. 2, instead of having two supporting pins 19 and 20, a single supporting pin 30 may be employed, extending from the upper end of the centrally located vertical arm 31 extending from the carrier frame, the pin then engaging in the pin hole 32 when the carrier frame is applied to the vehicle. With this arrangement, three supporting points are offered, namely, one at the connection between pin 30 and the opening 32 and the other two at the connections of the extensions 13 and 14 with the steps 8 and 9. This three point arrangement may perhaps be better for some purposes, as the effects of a twist or distortion of the machine frame will not be so noticeable on the carrier frame which will consequently remain more quiet and rigid.

Many other changes could also be made in the construction and arrangement without departing from the scope of my invention. Different builds of automobiles, of course, have different shaped frames, and the carrier frame construction would have to be in accordance therewith.

I claim as new and desire to secure by Letters Patent:

1. In combination, a vehicle, a carrier frame consisting of a longitudinal bar and a transverse bar secured together, the ends of such bars being upturned, a pin on the end of the transverse bar, and clamps on the ends of the longitudinal bar for securing the carrier frame to the vehicle frame.

2. In combination, a vehicle, a carrier frame consisting of longitudinal bars and transverse bars secured together, the ends of such bars being upturned, pins on the ends of the transverse bars, and clamps on the ends of one of the longitudinal bars for securing the carrier frame to the vehicle frame.

In witness whereof, I hereunto subscribe my name this 23rd day of April A. D., 1907.

EDWIN F. BROWN.

Witnesses:
CHARLES J. SCHMIDT,
FRED W. KOEHN.